United States Patent [19]

Moritoki et al.

[11] Patent Number: 4,478,626
[45] Date of Patent: Oct. 23, 1984

[54] METHOD OF HOT ISOSTATIC PRESSING TREATMENT

[75] Inventors: Masato Moritoki, Miki; Takao Fujikawa; Junichi Miyanaga, both of Kobe, all of Japan

[73] Assignee: Kabushiki Kaisha Kobe Seiko Sho, Kobe, Japan

[21] Appl. No.: 413,839

[22] Filed: Sep. 1, 1982

[30] Foreign Application Priority Data

Sep. 1, 1981 [JP] Japan .................. 56-138013

[51] Int. Cl.³ .................. C03B 19/06; C03B 19/09
[52] U.S. Cl. .................. 65/18.1; 65/24; 65/32; 65/59.5; 264/570; 425/405 H
[58] Field of Search .................. 65/18.1, 18.2, 18.4, 65/32, 59.5, 59.21, 59.27, 24; 264/570, 500; 425/405 H

[56] References Cited

FOREIGN PATENT DOCUMENTS

| 1148772 | 6/1983 | Canada. |
| 2133299 | 10/1973 | Fed. Rep. of Germany. |
| 2549048 | 5/1976 | Fed. Rep. of Germany. |
| 2950158 | 7/1980 | Fed. Rep. of Germany. |
| 445526 | 6/1975 | U.S.S.R. .................. 425/405 H |

OTHER PUBLICATIONS

Industrieanzeiger No. 93, Nov. 18, 1980, 102nd publ., p. 33, Verlag W. Girardet of Essen, West Germany.

Primary Examiner—Kenneth M. Schor
Attorney, Agent, or Firm—Oblon, Fisher, Spivak, McClelland & Maier

[57] ABSTRACT

A method of hot isostatic pressing in which a shaped work immersed in molten glass is subjected to a hot isostatic pressing treatment, the method basically including embedding a shaped item to be worked on in glass powder filled in a crucible; loading the crucible into a movable heating furnace having a heater and a heat insulating structure; charging the furnace into an atmospheric chamber; adjusting the atmosphere in the chamber into a predetermined condition and heating the crucible by the heater to soften and melt the glass in the crucible; transferring the furnace from the atmospheric chamber into a high pressure container while maintaining a high temperature in the furnace; admitting a pressing gas medium into the high pressure container while raising the temperature of the furnace to let the work in the crucible undergo a hot isostatic pressing treatment; and upon completion of the hot isostatic pressing treatment, taking out the furnace from the high pressure container with the work still in loaded state in the heating furnace. In an alternate embodiment of the invention, a plurality of heating furnaces are provided. and more than one atmospheric chamber for a single high pressure container to realize efficient HIP operation with a markedly shortened cycle time.

15 Claims, 4 Drawing Figures

METHOD OF HOT ISOSTATIC PRESSING TREATMENT

BACKGROUND OF THE INVENTION (1) Field of the Art

This invention relates to the so-called hot isostatic pressing (hereinafter referred to simply as "HIP" for brevity) for sintering, consolidation or diffusing bonding of metal or ceramic powder compacts in a high pressure and temperature gas atmosphere.

(2) Description of the Prior Art

The HIP treatment which isostatically compresses an item to be worked on using an inert gas as a pressure medium at high temperatures has been attracting the special attention of many concerns as an excellent technology which can be applied for the purpose of removing residual pores in cemented carbides by crushing, for producing sinters of high density from metal powder or ceramic powder or mixtures thereof, or for diffusing bonding of metallic materials. With regard to the HIP treatment, various proposals have been made, including a method of using a secondary pressure medium (Japanese Laid-Open Patent Application No. 47-30508), a method of using a metal capsule of a complicated shape, a method of using a glass capsule (Japanese Patent Publication No. 46-2731), a method of embedding a preliminarily molded work in glass powder and compressing the same by a high pressure gas after melting the glass (Japanese Laid-Open Patent Application No. 55-89405), etc. Of these proposals, the method of the aforementioned Japanese Laid-Open Patent Application No. 55-89405 is superior to other methods in that it requires neither a secondary pressure medium nor a special capsule or a gas-tight casing for sealing in a work.

However, in the just-mentioned method, it is required in the first place to heat the HIP system to melt the glass powder in which the preliminarily molded item to be worked on is embedded. However, as is well known in the art, the time required for raising the temperature to a level where the glass particles soften and melt varies largely under a pressurized condition and under atmospheric or reduced pressure, taking a considerably long time under atmospheric pressure. For example, high pressure argon gas of 1000 kg/cm$^2$ which is several hundreds times greater than argon at the atmospheric pressure in density is as low as 1.1 to 3 in viscosity, so that there occur vigorous convections, increasing the rate of convection heat transfer to an extremely great value. Accordingly, the rate of heat transfer from the furnace atmosphere to the work is escalated a considerable degree. If the furnace atmosphere gas is maintained at high pressure in heating, however, there arises a problem in that the high pressure gas is occluded in the melted glass and the preliminarily molded work, forming pores or defective structures in the final product to be obtained after the HIP treatment. It follows that the glass powder has to be melted by heating in a vacuum or in an inert gas atmosphere at most at the atmospheric pressure. Therefore, there will be required a longer time period for scavenging and gas replacing operations in addition to the longer heating time due to the drop in the heat transfer rate, lowering the operational efficiency of the relatively costly HIP system and as a result inviting increase in the production cost. To cope with the recent demand for larger products, there is a trend toward larger HIP systems, which involve a longer time period for each HIP cycle. In order to overcome this problem, there have been adopted various means for enhancing the efficiency of the HIP system, including the provision of a compressor of higher efficiency and capacity and improvement of the heater. The improvement of the HIP system itself has limitations and incurs large expenses.

SUMMARY OF THE INVENTION

An object of the present invention is to solve the above-mentioned various problems of the prior art systems, and has as its object the provision of a method of HIP treatment which utilizes molten glass as a secondary pressure medium to thereby shield off an item to be worked on from a primary pressure medium, and in which the time period of the HIP cycle is shortened significantly by the use of particular components units which are organically combined to efficiently perform particular steps of the operation, enchancing the operational efficiency and productivity of the costly HIP system.

More particularly, according to one aspect of the present invention, there is provided a method of hot isostatic pressing in which a pre-shaped item to be worked on immersed in molten glass is subjected to a hot isostatic pressing treatment, the method comprising the steps of embedding the work in glass powder filled in a crucible; loading the crucible into a movable furnace having a heater and a heat insulating structure; charging the furnace into an atmospheric chamber; adjusting the atmosphere in the chamber to a predetermined condition and heating the crucible by the heater to soften and melt the glass in the crucible; removing the furnace from the chamber into a high pressure container while maintaining a high temperature in the furnace; admitting a pressing gas medium into the high pressure container while raising the temperature in the furnace to let the work in the crucible undergo hot isostatic pressing; and upon completion of the treatment discharging charging the furnace from the high pressure container with the work item still in a loaded state in the furnace.

According to another aspect of the present invention, there is provided a method of hot isostatic pressing in which a pre-shaped work item immersed in molten glass is subjected to a hot isostatic pressing treatment, the method consisting of repeated cycles of operation comprising the steps of: providing a plurality of movable furnaces each having a heater and a heat insulating structure, more than one atmospheric chamber and high pressure container; embedding the work in glass powder filled in a crucible; charging the crucible into a first furnace; charging the first furnace into an atmospheric chamber and adjusting the atmosphere of the atmospheric chamber to a predetermined condition while heating the crucible in the furnace by the heater to soften and melt the glass in the crucible; transferring the furnace from the chamber into the high pressure container while maintaining the furnace at a high temperature; admitting pressurizing gas medium into the high pressure container while raising the furnace temperature to let the work in the crucible undergo a hot isostatic pressing treatment; while conducting the hot isostatic pressing treatment, sending into the atmospheric chamber a second furnace having a second work item similarly embedded in glass powder in a crucible to soften and melt the glass powder; taking out the first furnace from the high pressure container upon completion of the hot isostatic pressing treatment; and succeedingly charging the second furnace into the high pressure container.

The above and other objects, features and advantages of the present invention will become apparent from the following description and the appended claims, taken in conjunction with the accompanying drawings.

PARTICULAR DESCRIPTION OF THE INVENTION

The green compacts or shaped work items to be used in the present invention are suitably in the form of moldings which have been molded into desired shapes by the use of ceramic powder or fine metal powder. Such shaped works can be obtained by known means, including injection molding, rubber pressing, extrusion molding, hot pressing, hydrostatic pressing and the like, and normally has a relative density of about 60 to 95% based on the theoretical density of the material concerned. In a case where a shape retaining agent like an organic binder is added prior to the preforming operation, it is preferred to remove it before the HIP treatment by a heat treatment under 1000° C. thereby to decompose and evaporate the binder. In some cases, there arises the necessity for adjusting the shape and accuracy of the preformed work. Further, it is particularly desirable to apply on the surfaces of the preformed work a parting agent which consists of, for example, boron nitride, to assist release from the mold and to prevent deposition of molten glass in the subsequent stage.

The glass powder in which is the pre-shaped work is to be burried and which plays a role as a second pressurizing medium forming a gas impermeable mass when melted in the subsequent stage preferably does not contain a component which reacts with the material of the shaped work. Generally, fine powder or grains of Pyrex glass ®, Vycol glass ® and silica glass can be employed.

The crucible which holds the shaped work item and the glass powder in an amount sufficient for completely covering the work item is suitably formed of a heat and oxidation resistant material such as graphite, boron nitride, molybdenum or silicon carbide and the like, of which a graphite crucible is most advantageous in view of its heat resistance and availability. Further, the crucible preferably has interiorly positioned therein an upwardly diverging shape for facilitating the removal of solidified glass which remains on the inner wall surface of the crucible after the HIP treatment. Preferably, a parting agent such as powder of boron nitride is applied at least on the inner wall surface of the crucible to avoid the difficulty of mold release due to wetting with glass.

The crucible which has the shaped work item embedded in glass powder is placed in a furnace which has a heating means like an electric heater incorporated around its heat insulating circumferential wall and which is movable by a suitable transfer means. One example of a furnace which is suitable for application of the present invention is hereafter shown with reference to the drawings.

Figure 1:
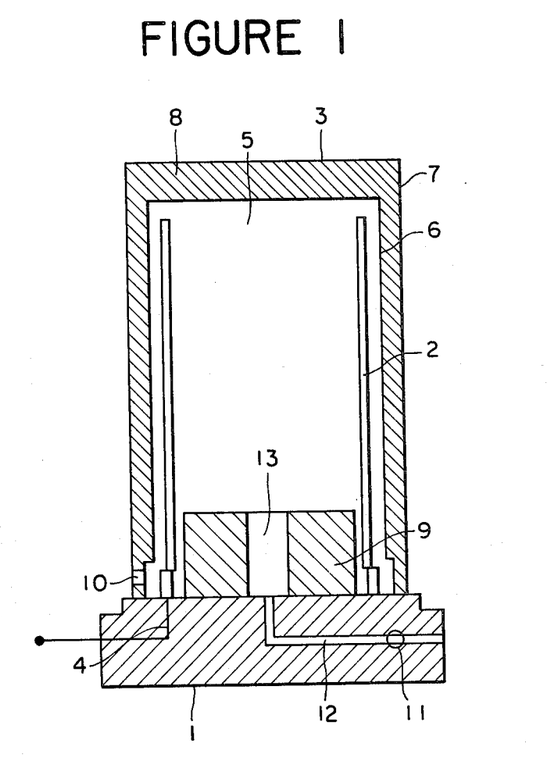
FIG. 1 is a schematic vertical section of a furnace to which the method of the present is applicable.

FIG. 1 illustrates such heating furnace in schematic vertical section, in which the furnace is provided with a heating element, a heating plate 2 in this particular example, on a lower plug 1. The heating element 2 is located on the inner side of a heat insulating structure 3 in an electrically insulated state. Power is supplied to the heating element 2 through an electrode 4 which is provided in the lower plug 1 in an electrically and hermetically insulated state. The heat insulating structure which encloses a treating chamber 5 including the heating element 2 is constituted by inverted-cup-like concentric inner and outer shells 6 and 7 and a fibrous heat insulator 8 like ceramic fibre which is filled therebetween, and detachably mounted on the lower plug 1. The upper surface of the lower plug 1 is covered with a heat insulating material 9, and the treating chamber 5 is communicable with the outside through an aperture 10 which is bored through part of the heat insulating structure 3. Further, the treating chamber 5 is adapted to receive a supply of atmospheric gas like an inert gas through a conduit 12 which is controlled by an on-off valve 11 and through a bore 13 in the heat insulating material 9.

With the heating furnace of the above-described construction, the crucible is placed in position on the lower plug 1 through the heat insulating material 9 after opening the treating chamber 5 by lifting the heat insulating structure 3 from the lower plug 1, and then the treating chamber 5 is closed by placing the heat insulating structure 3 on the lower plug 1 in preparation for charging into the atmospheric chamber. Needless to say, a number of crucibles may be placed in the furnace depending upon the size of the crucible and the capacity of the treating room 5 to thereby enhance the efficiency of operation.

In the next step of operation, the loaded heating furnace is charged into an atmospheric chamber, and, after adjusting the atmosphere of the chamber to a predetermined condition, the crucible or crucibles in the furnace are heated by energizing the heating element 2 to soften and melt the glass powder in the crucible. This stage of the operation is described in greater detail with reference to FIG. 2 which shows in schematic vertical section the heating furnace as charged in the atmospheric chamber. The open-bottomed cylindrical atmospheric chamber 14 is so dimensioned that its lower portion hermetically fits on the lower plug 1 of the furnace, and communicates with a vacuum pump (not shown) through its top wall and an exhaust pipe 15. After sealing the atmospheric chamber 14 by fitting and fixing the lower plug 1 in the bottom portion of the atmospheric chamber 14 as shown in the figure, its interior is scavenged by suctioning through the exhaust pipe 15 or simultaneously therewith it is replaced by an inert gas such as nitrogen gas, argon gas, helium gas or the like which is fed through the conduit 12. If the valve 11 is closed at the time of suction scavenge, the interior of the treating room 5 can also be replaced by a vacuum through the aperture 10. Thereafter, the valve 11 is opened, whereupon the atmospheric gas is fed through the conduit 12 and fills the treating room 5 and the chamber 14. If the suction scavenge is resumed, the atmospheric gas which is fed through the conduit 12 is discharged through the exhaust pipe 15 through the bore 13, treating room 5, aperture 10 and the space between the atmospheric chamber 14 and heating furnace, so that the crucible can be exposed to the atmospheric gas flow under a predetermined pressure by suitably adjusting the amounts of feeding and exhausting atmospheric gas. In any case, the pressure in the atmospheric chamber 14 is preferably substantially lower than the atmospheric pressure to prevent the treating work from absorbing a large amount of gas. While adjusting the atmospheric chamber 14 to a predetermined condition as mentioned hereinbefore, the heating element 2 is energized to heat the crucible 16 to soften and melt the glass powder in the crucible. In this connection, it is desired to employ a high melting temperature so that the molten glass has a viscosity which is low enough for covering the entire surfaces of even a work item of a complicated shaped. For example, it is desirable to employ a temperature of at least 1000° C. for Pyrex glass ® and a temperature of at least 1500° C. for silica glass depending upon its purity and composition. Since vacuum or an inert gas is maintained in the treating room, the crucible is substantially free of degeneration or embrittling due to oxidation reactions.

As soon as the work is completely covered with the molten glass and shielded from the ambient atmosphere, a suitable inert gas is fed to replace the atmosphere if it is a vacuum. Then, the lower plug 1 is a detached from the atmospheric chamber 14, and the heating furnace which holds the crucible 16 is taken out of the atmospheric chamber 14 and sent as it is into the high pressure container to undergo the HIP treatment. Now, reference is made to FIG. 3 which illustrates this step of the operation in schematic vertical section, with the heating furnace in position in the high pressure chamber.

Figure 3:
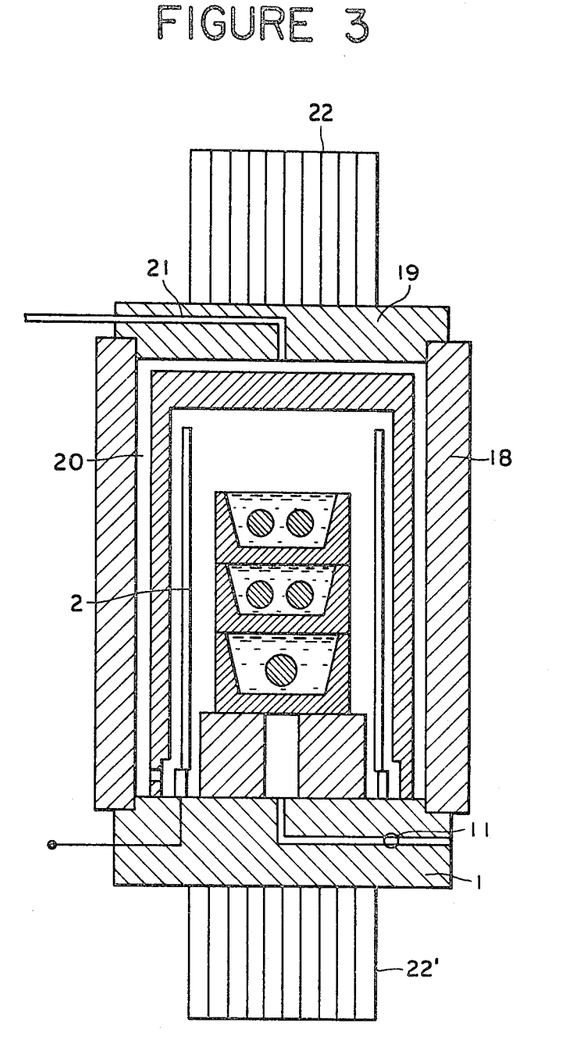

In FIG. 3, the high pressure container is constituted by a pressure resistant cylinder 18 and an upper plug 19 which hermetically closes the upper end of the cylinder. The lower plug 1 of the furnace is hermetically fitted in the lower end portion of the cylinder 18 to form a high pressure chamber 20 therein. Bored through the upper plug 19 is a conduit 21 for the supply and discharge of a gaseous pressurizing medium. Further, in the particular example shown, the upper and lower plugs 19 and 1 are held in fitted positions by press mechanisms 22 and 22' to prevent their becoming disjointes during operation.

With the foregoing arrangement, the furnace which is internally maintained at an elevated temperature is fixed in the high pressure container by hermetically fitting the lower plug 1 of the furnace in the lower end portion of the pressure resistant cylinder 18. Then, the valve 11 is closed and a gaseous pressurizing medium is introduced into the high pressure chamber 20 through the conduit 21, while continually elevating the furnace temperature by maintaining the heating element 2 in an energized state to carry out the HIP treatment. In this instance, the pressure is applied by using as a primary pressurizing medium an inert gas such as nitrogen gas, argon gas or helium gas of at least 500 atms, and the temperature is selected from a range which is high enough for inducing plastic flow to the work item. During the HIP treatment, the molten glass completely covers the work item and therefore serves as a capsule which shields the work from the primary pressure medium, and at the same time acts as a secondary pressure medium without intruding or impregnating into the work to produce a fine sinter or a void-free molding of almost theoretical density. Upon completion of the HIP treatment, the gaseous pressure medium is discharged through the exhaust pipe 21 to restore normal pressure in the furnace, and the pressing mechanisms 22 and 22' are retracted to detach the lower plug 1 from the pressure resistant cylinder 18, taking the same out from the high pressure container together with the furnace. When the temperature in the treating room 5 is still at a level at which oxidative combustion occurs to the internal heater and crucible upon exposure to the atmosphere, the furnace is cooled off as it is or in an atmospheric gas, and then the mass of solidified glass and the high-density sintered work item under the atmospheric pressure is cooled. The major portion of the glass is melted off again in the atmospheric furnace, and the glass which still remains on the surfaces of the sintered product is removed by sand blasting or other suitable means. In a case where the crucible has been applied with a parting agent on the upwardly diverging inner wall surfaces, the solidified glass can be separated from the crucible in an extremely facilitated manner.

One preferred method of separating glass from the work is to remove it when it is still in molten state. For this purpose, there may be employed means for tilting the crucible to pour out the molten glass or means for lifting the sintered work. The most preferred method of separation is to provide at the bottom of the crucible a support with openings like a hurdle, grill, wire mesh or the like to support the work thereon. After conducting the HIP treatment on the work which is completely immersed in the molten glass, the support is lifted up out of the crucible together with the work so that the major portion of the molten glass is drained off.

The glass which has be separated and collected in this manner is crushed into powder and reused for operation according to the invention. Although it is relatively easy to remove glass from a work which has been applied with a parting agent on its furface beforehand, there is a possibility of the glass remaining in a filmy form on the surface of the work where the parting agent had come off, when the surfaces of the glass and the work of ceramics or the like are wetted, or when there occurs a reaction between the glass and the surface of the work. Such glass can be removed by mechanical means like sand blasting or by a chemical treatment with hydrofluoric acid.

In the above-described first embodiment, a movable furnace is first combined with an atmospheric chamber for softening and melting glass and then with a high pressure container for the HIP treatment. Therefore, it becomes possible to shorten the time period of occupying the HIP system, namely, the time of HIP cycle to a considerable degree as compared with the conventional processes in which the HIP system is occupied for both the glass-melting operation and the HIP treatment. The concept of the present invention can be further developed to rationalize the respective steps of operation by the use of a plurality of heating furnaces and more than one atmospheric chamber which are controlled according to a predetermined program to enhance the efficiency of the HIP treatment.

Figure 2:
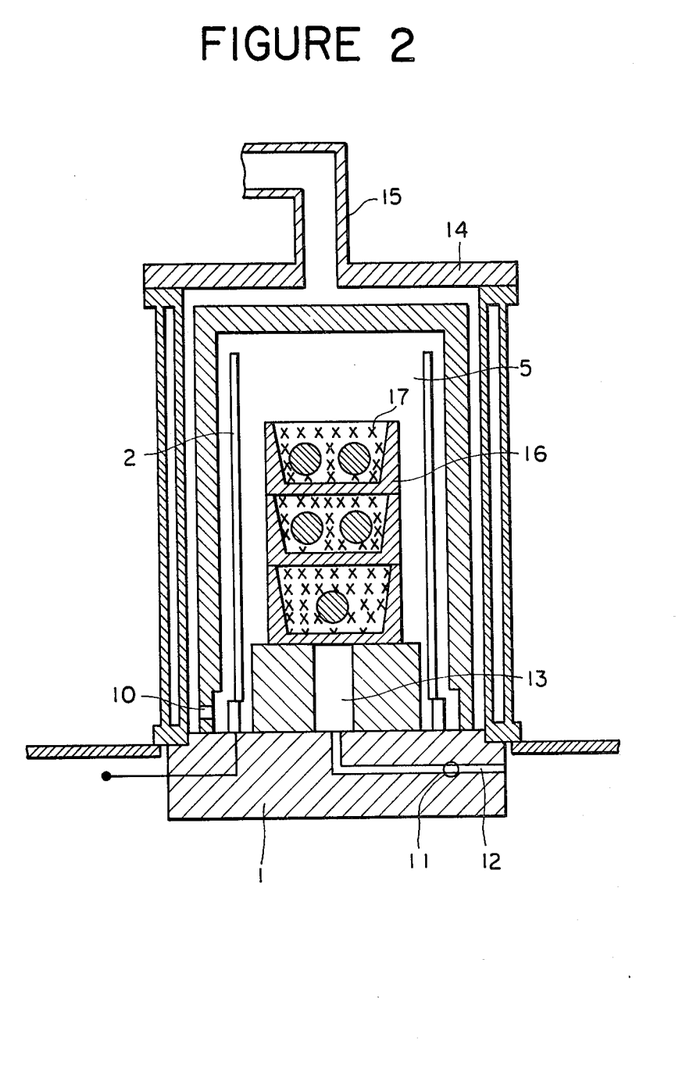
FIGS. 2 and 3 are schematic sections of the same furnace as received in an atmospheric chamber and a high pressure container, respectively.
Figure 4:
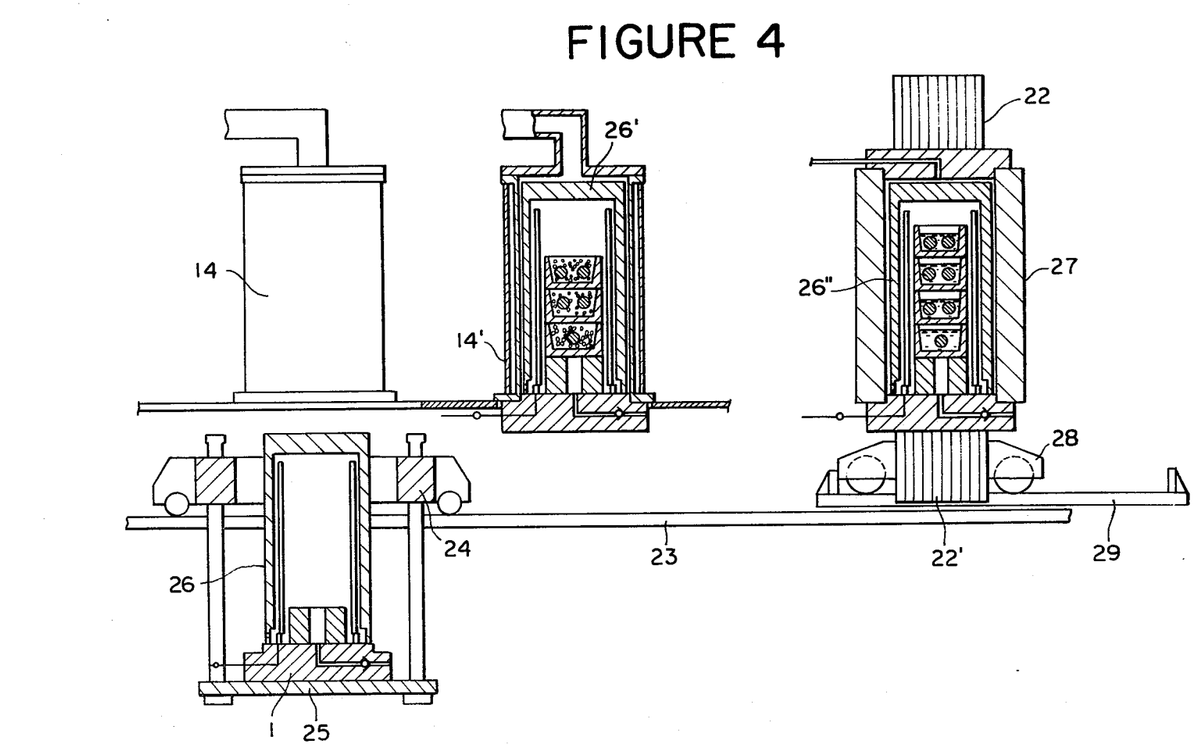
FIG. 4 is a schematic illustration employed for explanation of another embodiment of the present invention.

FIG. 4 schematically illustrates a system which incorporates the concept of the present invention for such rationalized operation, including a carriage 24 which is movable on and along a track 23 and carrying on a suspended liftable support plate 25 a heating furnace which is of the same construction as that shown in FIG. 1. Provided successively above and along the track 23 are a plurality of atmospheric chambers 14 and a high pressure chamber 27. The atmospheric chambers 14, 14' and the high pressure container 27 have the same construction as shown in FIGS. 2 and 3. In this particular example shown, there are provided three heating furnaces including the first one 26 in stand-by position for loading a crucible, the second one 26' charged in an atmospheric chamber 14 and the third one 26" charged in the high pressure container 27, two atmospheric chambers 14 and 14', and one high pressure container 27. The pressing mechanisms which hold the upper and lower plugs of the high pressure container 27 are mounted on the carriage 28 and are movable to a retracted position by travel along the track 29.

With this system arrangement, after loading on the first furnace 26 a crucible which holds a shaped work in glass powder in the manner as described hereinbefore, the furnace 26 is positioned immediately beneath the atmospheric chamber 14 and inserted thereinto by lifting the furnace by a lift mechanism until the lower plug 1 is hermetically fitted in the bottom of the atmospheric chamber 14. In this state, conditioning of the furnace atmosphere and temperature elevation are effected in the same manner as described hereinbefore to soften and melt the glass Powder.

In the meantime, HIP treatment is completed in the high pressure container 27 and substantially at the same time the second furnace 26' in the atmospheric chamber 14' comes to the end of the glass-melting operation. Therefore, the furnaces 26" and 26' are unloaded by the operation of the carriage 24. Immediately after unloading the third heating furnace 26", the second furnace 26' is loaded into the high pressure chamber 27 to start the next cycle of HIP treatment. The crucible in the third furnace 26" is replaced by a fresh crucible to be sent to the glass-melting operation in the atmospheric chamber 14'.

In performing a series of the above-described operations, the cycle of the HIP treatment can be repeated with the least time intervals by determining the operating conditions such that the time of HIP treatment is about half the time length of the melting treatment in the atmospheric chambers and effecting the heating, loading, unloading and transfer of the furnaces according to a suitable program.

As clear from the foregoing description, the method of the present invention is uncomparably rationalized as compared with the conventional method, in which a work embedded in solid glass powder is heated in a HIP system over a long time period under low pressure prior to pressing by nitrogen gas, argon gas or helium gas, occupying the HIP furnace for a relatively long period of time for the low pressure heating although it is originally designed for high pressure heating. In contrast, according to the method of the present invention employing a movable heating furnace or furnaces to effect the low pressure heating separately in an atmospheric chamber, the time period over which the HIP furnace is occupied by each work is shortened considerably, and the heating furnace of elevated temperature can be subjected to the pressing operation immediately after loading into the high pressure container, obviating the need for cooling off the high pressure container after each HIP treatment. Thus, the present invention contributes to shortening the time period of the HIP cycle and to enhancing the operation efficiency to a marked degree.

Hereafter, the invention is illustrated more particularly by way of an example.

EXAMPLE

Powder of silicon nitride of 1.5 um in average particle size was shaped by a hydrostatic press under a pressure of 3000 kgf/cm$^2$, obtaining green compacts of 60% in relative density. Then powder of boron nitride was applied on the surfaces of the shaped work, placing the work in a graphite crucible having boron nitride powder coated on upwardly diverging inner wall surfaces. The work in the crucible was embedded in the powder of Pyrex glass ® of the following composition.

$SiO_2$:80.75 wt %
$B_2O_3$:12.00 wt %
$Na_2O$:4.10 wt %
$K_2O$:0.10 wt %
$CaO$:0.30 wt %
$Al_2)O_3$:2.20 wt %
$AS_2O_3$0.40 wt %

The loaded crucible was placed in a heating furnace as shown in FIG. 1 and then in an atmospheric chamber as shown in FIG. 2. After once scavenging the atmospheric chamber into vacuum, nitrogen gas of substantially atmospheric pressure was fed thereinto while energizing the heating element to raise the temperature up to 1200° C. in about 6 hours and that temperature was retained for 30 minutes. Thereafter, the heating furnace was placed in a high pressure container as shown in FIG. 3, applying pressure by argon gas and raising the pressure up to 1000 kgf/cm$^2$ at 1800° C. After maintaining the furnace in that state for 1 hour, the pressure was released and the heating furnace was taken out at a time point when the furnace temperature dropped to 1200° C. The HIP treatment took 3.5 hours, and the resulting $Si_3N_4$ sinter had a relative density of 99%, proximate to its theoretical density. In this particular example, it was possible to produce an $Si_3N_4$ sinter of high quality of a cycle of 3.5 hours by employing two atmospheric chambers and three heating furnaces for a single high pressure container.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of hot isostatic pressing in which a shaped item to be worked immersed in molten glass in subjected to a hot isostatic pressing treatment, said method comprising:
    embedding said shaped item to be worked in glass powder disposed in a crucible;
    loading said crucible into a movable heating furnace having a heater and a heat insulating structure;
    charging said furnace into an atmospheric chamber;
    adjusting the atmosphere in said chamber to a predetermined condition and heating said crucible by said heater to soften and melt said glass in said crucible;
    transferring said furnace from said atmospheric chamber into a high pressure container while maintaining a high temperature in said furnace;
    admitting a pressurizing gas medium into said high pressure container while raising the temperature of said furnace such that said item to be worked on in said crucible undergoes a hot isostatic pressing treatment; and upon completion of said hot isostatic treatment, removing said furnace from said high pressure container with said item to be worked being maintained in a loaded state.

2. A method of hot isostatic pressing as set forth in claim 1, wherein said shaped item to be worked further comprises a green compact of ceramic powder.

3. A method of hot isostatic pressing as set forth in claim 1, wherein said crucible is of graphite and has an upwardly diverging inner shape.

4. A method of hot isostatic pressing as set forth is claims 1, 2 or 3, which further comprises applying a parting agent to the surfaces of said item to be worked on prior to loading into said crucible for preventing adhesion of molten glass.

5. A method of hot isostatic pressing as set forth in claims 1, 2 or 3, which further comprises coating said crucible with a parting agent on the inner surfaces thereof to prevent adhesion of molten glass.

6. A method of hot isostatic pressing as set forth in claim 4, wherein said parting agent comprises boron nitride powder.

7. A method of hot isostatic pressing as set forth in claims 1, 2 or 3, which further comprises loading a plurality of crucibles into said heating furnace.

8. A method of hot isostatic pressing in which a shaped item to be worked immersed in molten glass is subjected to a hot isostatic pressing treatment, the method including a repeated cycle of operation which comprises the steps of:

providing a plurality of movable heating furnaces each having a heater and a heat insulating structure, more than one atmospheric chamber, and a high pressure container;

embedding said item to be worked in glass powder disposed in a crucible;

loading the crucible into a first furnace;

charging said first furnace into an atmospheric chamber and adjusting the atmosphere of said chamber to a predetermined condition while heating said crucible in said furnace by said heater to soften and melt said glass in said crucible;

transferring said first furnace from said atmospheric chamber to said high pressure container while maintaining said furnace at a high temperature;

introducing a pressing gas medium into said high pressure container while raising the furnace temperature such that said item to be worked on in said crucible undergoes a hot isostatic pressing treatment;

sending a second heating furnace into said atmospheric chamber having a second item to be worked on similarly embedded in glass powder in a crucible to soften and melt the glass powder while conducting said hot isostatic pressing treatment;

taking out said first heating furnace from said high pressure container upon completion of said hot isostatic treatment; and succeedingly charging said second furnace into said high pressure container.

9. A method of hot isostatic pressing as set forth in claim 8, wherein said shaped item to be worked on further comprises a molded ceramic material.

10. A method of hot isostatic pressing as set forth in claims 8 or 9, wherein said crucible further comprises graphite and has an upwardly diverging inner shape.

11. A method of hot isostatic pressing as set forth in claims 8 or 9, which further comprises applying a parting agent to said item to be worked on prior to loading into said crucible for preventing adhesion of molten glass.

12. A method of hot isostatic pressing as set forth in claims 8 or 9, which further comprises coating said crucible with a parting agent on the inner surfaces thereof to prevent adhesion of molten glass.

13. A method of hot isostatic pressing as set forth in claim 11, wherein said parting agent further comprises boron nitride powder.

14. A method of hot isostatic pressing as set forth in claims 8 or 9, which further comprises simultaneously loading a plurality of crucibles into a single heating furnace of said plurality of heating furnaces.

15. A method of hot isostatic pressing as set forth in claim 12, wherein said parting agent comprises boron nitride powder.

* * * * *

UNITED STATES PATENT AND TRADEMARK OFFICE
CERTIFICATE OF CORRECTION

PATENT NO. : 4,478,626

DATED : October 23, 1984

INVENTOR(S) : MASATO MORITOKI ET AL

It is certified that error appears in the above-identified patent and that said Letters Patent is hereby corrected as shown below:

In the Abstract, 4th line from bottom delete the "." after provided.

Column 2, line 40, delete "charging".

Column 3, line 12, change "present" to --present invention--.

Column 3, lines 18 and 19, change "PARTICULAR DESCRIPTION OF THE INVENTION" to --DETAILED DESCRIPTION OF THE PREFERRED EMBODIMENTS--.

Column 3, line 42, change "burried" to --buried--.

Column 3, line 41, change "is the pre-shaped work" to --the pre-shaped work item--.

Column 4, line 56, change "simulataneously" to --simultaneously--.

Column 5, line 15, change "shaped" to --shape--.

UNITED STATES PATENT AND TRADEMARK OFFICE
CERTIFICATE OF CORRECTION

PATENT NO. : 4,478,626

DATED : October 23, 1984

INVENTOR(S) : MASATO MORITOKI ET AL

It is certified that error appears in the above-identified patent and that said Letters Patent is hereby corrected as shown below:

Column 5, line 25, change "is a detached" to --is detached--.

Column 5, line 44, change "disjointes" to --disjointed--.

Column 6, line 32, change "be" to --been--.

Column 6, line 36, change "furface" to --surface--.

Signed and Sealed this

Eleventh Day of June 1985

[SEAL]

Attest:

DONALD J. QUIGG

Attesting Officer     Acting Commissioner of Patents and Trademarks